March 17, 1964 R. J. SCHUETTE, JR 3,125,254
HOPPER AND CLOSURE GATE
Filed Sept. 29, 1961 3 Sheets-Sheet 1

Roland J. Schuette, Jr.
INVENTOR.

BY *Clarence A. O'Brien*
and *Harvey B. Jacobson*
Attorneys

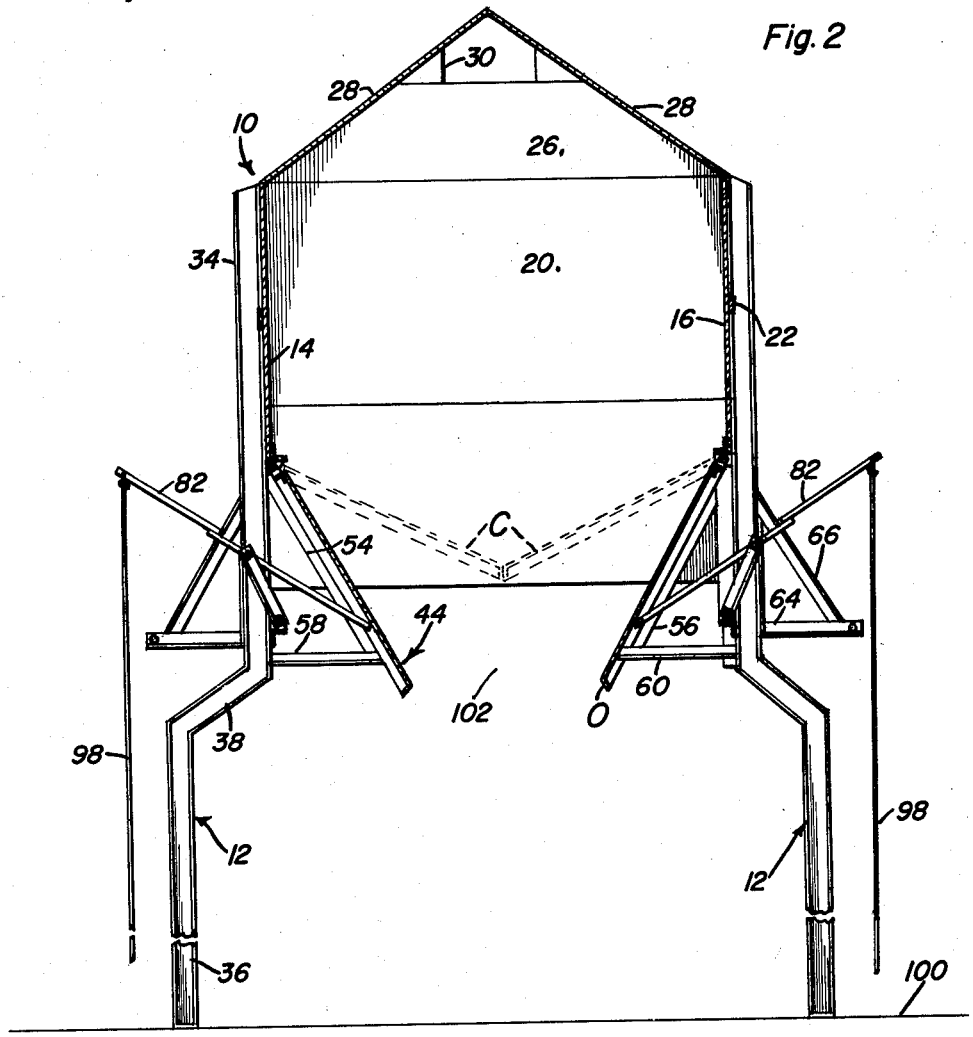
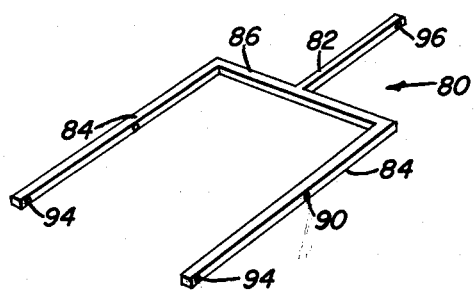

March 17, 1964  R. J. SCHUETTE, JR  3,125,254
HOPPER AND CLOSURE GATE
Filed Sept. 29, 1961  3 Sheets-Sheet 3

Roland J. Schuette, Jr.
INVENTOR.

BY *[signatures]*
Attorneys 3,125,254
HOPPER AND CLOSURE GATE
Roland J. Schuette, Jr., Slaton, Tex., assignor to Triangle Manufacturing Company, Inc., Slaton, Tex., a corporation of Texas
Filed Sept. 29, 1961, Ser. No. 141,779
7 Claims. (Cl. 222—185)

This invention relates to hoppers and particularly to elevated hoppers which are adapted for storing cotton burrs and automatically loading them into trucks or other vehicles.

It is a primary object of the invention to provide a hopper for gravity loading of materials that have a tendency to adhere together into trucks or other hauling devices.

It is another object of the invention to provide an elevated hopper supported on legs which permit a vehicle such as a truck to be driven under the hopper, the legs being offset to provide ample clearance for the vehicle.

It is another object of the invention to provide a hopper having vertical side walls so the material will fall freely through the bottom thereof.

It is yet another object of the invention to provide an elevated hopper having doors therein at the bottom thereof so designed that when opened the doors will act as funnels for guiding the material flowing from the hopper into a hauling vehicle.

It is still another object of the invention to provide a hopper having doors which are operated by a rope mechanism whereby the doors may be either opened or closed merely by yanking on the rope of the mechanism.

It is still another object of the invention to provide an elevated hopper for loading vehicles which is relatively simple in design, economical to manufacture, reliable in use and requires a minimum of maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a vertical cross sectional view taken through a central portion of the hopper shown in FIGURE 1;

FIGURE 7 is a perspective view of a portion of the door operating mechanism.

Figure 1:
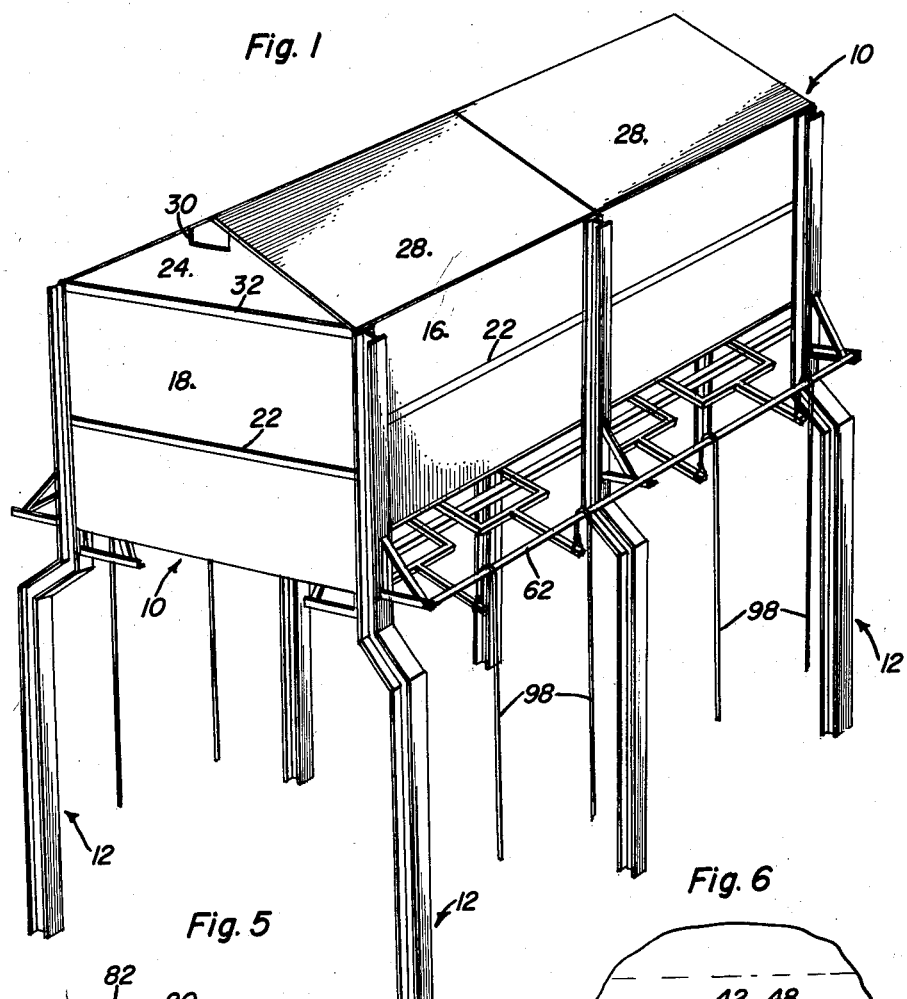
FIGURE 1 is a perspective view of the hopper.

As shown in the drawings, the hopper comprises a generally rectangular housing 10 supported in a vertical position above the earth on a plurality of legs 12.

The housing 10 comprises two parallel side walls 16 connected at their ends to the front wall 18 and a rear wall 20. The top edges of these four walls are all coplanar, however, the front and rear walls are greater in depth than the side walls and extend substantially below same. The walls are preferably reinforced by horizontal bracing strips 22.

The rectangular opening between the upper edges of the walls is enclosed by a roof structure comprising front and rear gables 24 and 26 covered by sloping rectangular roof panels 28. The apex of the gables 24 and 26 is cut out to form ventilating openings 30. The gables 24 and 26 are reinforced by girders or strips 32 similar to the strips 22.

The legs 12 which support the housing 10 in an elevated position are formed from I-beams and each comprises an upper portion 34 connected to an outwardly offset lower portion 36 by an outwardly and downwardly sloping portion 38. The upper portion 34 is rigidly secured by conventional means, not shown, to the side walls 14 and 16. The strips 22 on the side walls may be notched for receiving the portions 34 of the legs.

Figure 6:
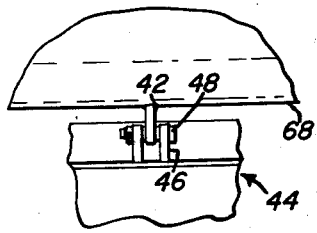
FIGURE 6 is a vertical cross sectional view taken substantially on the plane of line 6—6 in FIGURE 3.

The bottom inside edges of the side walls 14 and 16 each have secured thereto horizontally extending angle members 40. At longitudinally spaced points, angle members 40 have secured thereto and projecting downwardly therefrom lug members 42. A door 44 is pivotally connected to the lower edges of each of the side walls by means of outwardly projecting lug members 46 which are rigidly secured to the upper outer edges of the doors. Shown in FIGURE 6, the lug members 46 are arranged in spaced pairs for receiving a lug member 42, and these lug members are pivotally connected together by a generally horizontally extending bolt and nut assembly 48.

Each of the doors 44 comprise a generally rectangular frame assembly 50 composed of a plurality of angle members and a smooth covering 52 secured to the upper surfaces of the frame 50. As shown in FIGURE 2, when the doors 44 are closed, they are completely elevated above the bottom edges of the front and rear walls 18 and 20.

FIGURE 2 illustrates the doors 44 in their fully open positions. When the doors are fully opened, they are supported on a plurality of spaced door support members 54 secured to the bottom edge of the side walls 14 and a plurality of door support members 56 secured to the bottom edge of the side wall 16. These door support members preferably are formed from angle members and converge toward each other in a downward direction. The lower ends of the door support members are braced by horizontally extending braces 58 and 60 also composed of angle members and connected to the leg portions 34.

A rope guide comprising a rod 62 is supported on each side of the housing 10 slightly below the doors 44. The rods 62 are supported on the legs 12 by means of a plurality of spaced horizontal braces 64 and truss members 66, both also preferably composed of angle members.

Figure 5:
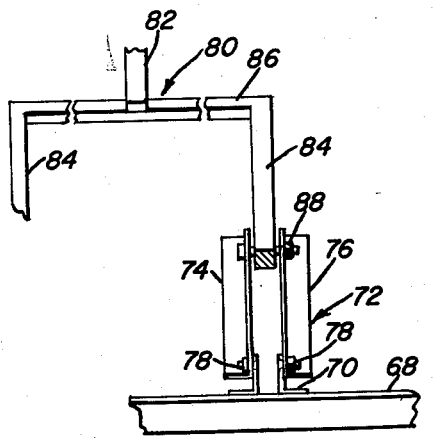
FIGURE 5 is a vertical cross sectional view taken substantially on the plane of line 5—5 of FIGURE 4.

Directly below each of the side walls 14 and 16, a horizontal angle support 68 is secured to the inner sides of the upper portions 34 of the legs. Rigidly secured to the upper surface of each support 68 is eight pairs of angle brackets 70 as shown in FIGURE 5. The angle brackets 70 in each pair are slightly spaced from one another and the vertically extending legs thereof are in opposing relationship. Pivotally connected to the angle brackets 70 are a plurality of link assemblies 72. Each link assembly 72 comprises an angle member 74 and an angle member 76 in opposing relationship and each pivotally connected at one end to one of the angle brackets 70 by nut and bolt assemblies 78.

Figure 3:
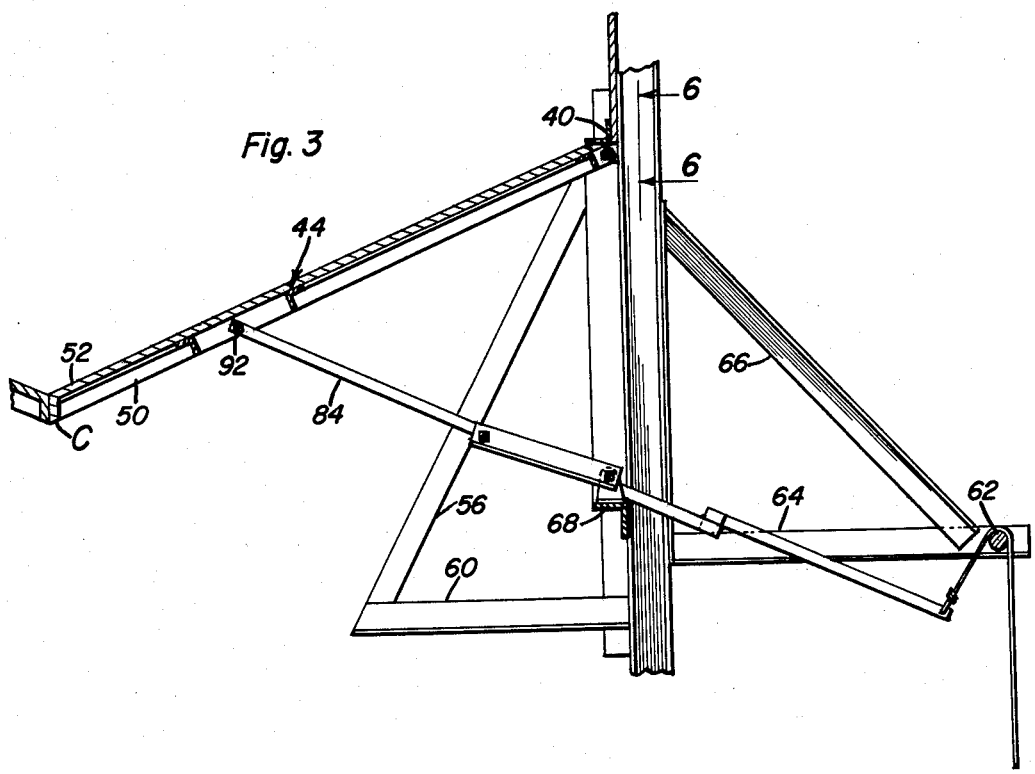
FIGURE 3 is an enlarged view of a door and operating mechanism therefor as shown in FIGURE 2.

A plurality of yokes 80 are pivotally connected to and supported on the supports 68 by means of the link assemblies 72. Each yoke 80 comprises an arm 82 and a pair of parallel legs 84 connected to each other and the arm by means of a bight 86, as shown in FIGURE 7. Each leg 84 extends between a pair of adjacent angle members 74 and 76 comprising a link assembly 72 as shown in FIGURE 5, and the legs are pivotally connected to the angle members by a nut and bolt assembly 88 which extends through a bore 90 in the leg and aligned bores in the upper ends of the angle members. The free ends of the legs 84 are pivotally connected to transversely extending angle members comprising the door frame 50 by means of nut and bolt assemblies 92 which extend through bores 94 in the free ends of the legs and aligned bores in the frame 50. The yoke 80 may be made in one integral piece as shown in FIGURE 7, or alternatively the arms 82 may be made separately and welded to the bights 86 as shown in FIGURE 3. A bore 96 is formed in the free end of each of the arms 82 and receives one end of an operating rope or cable 98 which is looped back upon and tied to itself. Each of the ropes 98 extends upwardly from the arms 82 and is looped over the rod 62. The free ends of the ropes 98 extend downwardly and are spaced a few feet above the ground 100.

Figure 4:
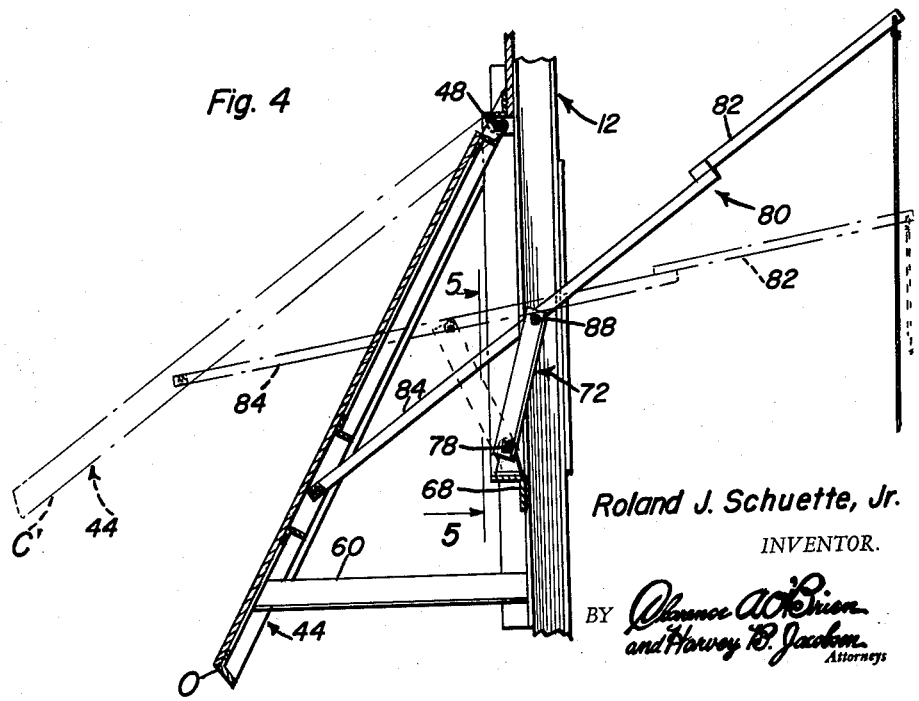
FIGURE 4 is a view similar to FIGURE 3 but showing the door and its operating mechanism in a different position.

When the hopper is in operation, the doors are in the open or O position as shown in FIGURES 2 and 4 whereby the material in the housing 20 such as cotton burrs for example may flow freely down the inclined upper surfaces of the doors and through the openings 102. When the doors are in the O position, they are supported on the door support members 54 and 56 and the arms 82 are elevated and inclined upwardly and outwardly from the housing 10.

To close either of the doors 44 so as to move it to the C or closed position, it is only necessary to give a quick tug or jerk to one of the ropes 98 on one side of the hopper. A quick jerk on one or more of the ropes on one side of the hopper causes the yokes 80 to pivot about the pivot connections 88 in a clockwise direction as viewed in FIGURE 4 thereby causing the yoke to move from the position illustrated in solid lines to the position illustrated in dotted lines. This causes the door 44 also to pivot in a clockwise direction as viewed in FIGURE 4 about its pivot connection 48 and move to the C position. The initial tug on the rope or ropes 98 moves the door 44 a fraction of the way to its closed position, and the momentum of the door and its parts causes it to coast to the fully closed position. As the door coasts to the fully closed position, the free or outer ends of the arms 82 move downwardly below the rod 62 as shown in FIGURE 3.

To open either of the doors, it is only necessary to again exert a tug on the appropriate rope or ropes 98 as indicated by the arrow in FIGURE 3, and this causes the yokes 80 to pivot in a counter-clockwise direction as viewed in this figure about this pivot connection 88. The initial tug causes the doors and yokes to move through a fraction of their operating range, whereby they coast to the fully open position. When the doors are fully closed, the legs 84 of the yoke extends between the angle members 74 and 76 of the link assemblies as shown in FIGURE 3. As the doors are moved from the open to the closed position and vice versa, the link assembly 72 oscillates back and forth about the pivot points 78 on the support 68. It is also to be noted that when the doors are in the fully closed position as shown in FIGURE 3, the legs 84 by moving between the angle members 74 and 76 have moved to an over-center position with respect to these angle members thereby positively holding the doors in a closed position.

When the doors are in the fully open position as shown in FIGURE 2, they act as funnels for funneling the material within the housing 10 into a vehicle below the housing. Also, the slope of the doors when opened is sufficient to prevent material within the housing from jamming or bridging the doors. By having the lower portions of the legs outwardly offset from the upper portions, ample clearance is provided for permitting large vehicles such as tractor trailer trucks to have ample clearance for maneuvering below the housing 10 without danger of striking the legs. Also, it is to be noted that the doors may be operated independently of one another, and if desired only one door may be opened for directing the flow from the housing at a reduced rate to one side of the space below the housing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hopper for storing and unloading flowable material comprising housing means including vertical side walls, a chamber within the housing means for retaining the material, an opening in the bottom of said housing means communicating with said chamber, door means pivotally connected to the side walls of said housing means so as to alternately open and close said opening, said door means including two doors converging downwardly toward each other to form a first angle when closed and converging downwardly toward each other to form a second angle when open, said first angle being greater than said second angle, operating means connected to each of said doors for pivoting said doors and support means rigidly fixed to and having portions angularly oriented with respect to said side walls for supporting said door means in their open position causing them to form a funnel for the flowable material and supporting said housing means above the ground level.

2. The hopper of claim 1 wherein said support means includes a plurality of legs supporting said housing, each of said legs including a lower leg portion offset outwardly with respect to an upper leg portion and said housing means.

3. The hopper of claim 1 wherein said operating means includes a guide member disposed transversely of said support means, a linkage assembly connected to and adapted for moving each of said doors to an open and closed position, manually operable means including a manually operable flexible member adapted to be draped over said guide member and operatively connected to a toggle link of said linkage assembly for actuation thereof, said flexible member when successively moved in the same general direction causing said linkage assembly to alternately open and close said doors with respect to said opening due to the binding and releasing of said toggle link.

4. The hopper of claim 1 wherein said operating means includes a linkage assembly pivotally connected to each of said doors for opening and closing the same and actuating means for said linkage assembly, said linkage assembly including a yoke member pivoted at one of its ends to said door, toggle link means pivoted to said support means at one of its ends and pivoted to said yoke member intermediate the ends thereof at its other end, said actuating means including a flexible manually operable member connected to the other end of said yoke member and draped over a transverse guiding element fixed to said support whereby upon actuation of said flexible operating member the yoke and door will be caused to pivot to a closed position and where upon further actuation said toggle link will assume an over-center locked position holding said door in closed position, further actuation of said flexible operating member in the same direction releasing said toggle link from a locked position to permit opening of said door.

5. The hopper of claim 4 wherein a plurality of linkage assemblies are pivotally connected to each of said doors, each of said linkage assemblies being independently actuatable.

6. A hopper of the type having vertical side walls and two doors alternately opening and closing an opening therein and pivoted to said side walls, said doors converging downwardly toward each other to form a first angle when closing said opening and converging downwardly toward each other to form a second angle when exposing said opening, said first angle being greater than said second, door operating means for manually controlling the opening and closing of said doors and locking said doors when in closed position, said operating means including a linkage assembly pivotally connected to each of said doors and opening and closing the same and actuating means for said linkage assembly, said linkage assembly including a yoke member pivoted at one of its ends to said door, toggle link means pivoted to a fixed support means adjacent a side wall of the hopper at one of its ends and pivoted to said yoke member intermediate the ends thereof at its other end, said actuating means including a flexible manually operable member connected to the other end of said yoke member and draped over a transverse guiding element fixed to said support means whereby upon actuation of said flexible operating member the yoke and door will be caused to pivot to a closed position and whereupon further actuation of said toggle link will assume an over-center lock position holding said door in closed position, a further actuation of said flexible operating member in the same direction releasing said toggle link from a locked position to permit opening of said door.

7. A hopper having vertical side walls and two doors alternately opening and closing an opening therein and pivoted to said side walls, said doors converging downwardly toward each other to form a first angle when closing said opening and converging downwardly toward each other to form a second angle when exposing said opening, said first angle being greater than said second, door operating means for manually controlling the opening and closing of said doors and locking said doors when in closed position, said operating means including a guide member disposed transversely of a fixed support means adjacent the side wall of the hopper, a linkage assembly connected to and adapted for moving each of said doors to an open and closed position, manually operable means including a manually operable flexible member adapted to be draped over said guide member and operatively connected to a toggle link of said linkage assembly for actuation thereof, said flexible member when successively moved in the same general direction causing said linkage assembly to alternately open and close said doors in respect to said opening due to the binding and releasing of said toggle link.

References Cited in the file of this patent
UNITED STATES PATENTS

| | | |
|---|---|---|
| 428,731 | Singer | May 27, 1890 |
| 924,726 | Blaker | June 15, 1909 |
| 1,215,418 | Selleck | Feb. 13, 1917 |
| 1,566,148 | Lindsey | Dec. 15, 1925 |